April 14, 1936.  E. BOECKING  2,037,454
FILM FRAMING DEVICE
Filed Aug. 10, 1934  2 Sheets-Sheet 2
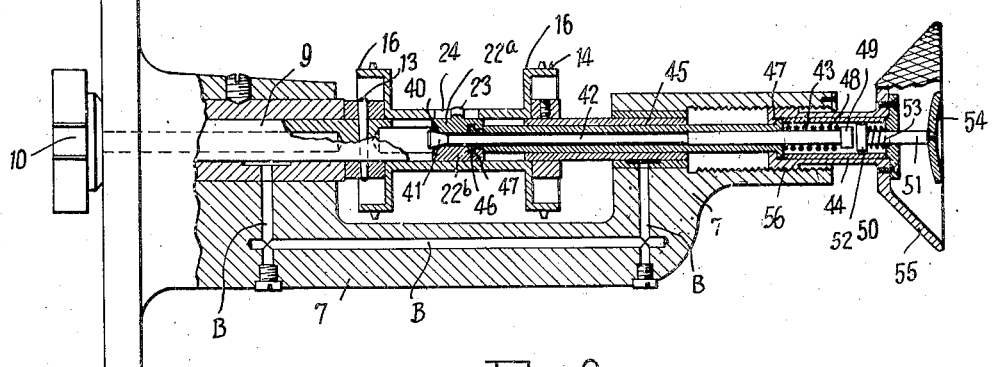
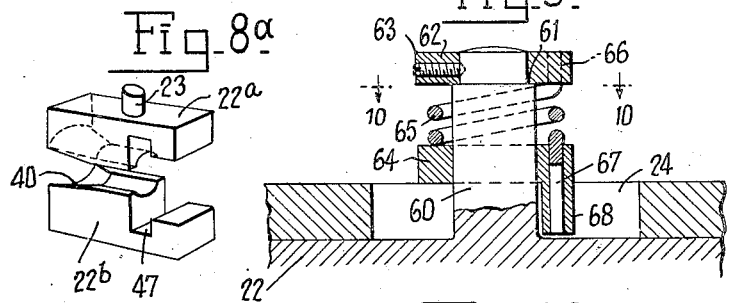
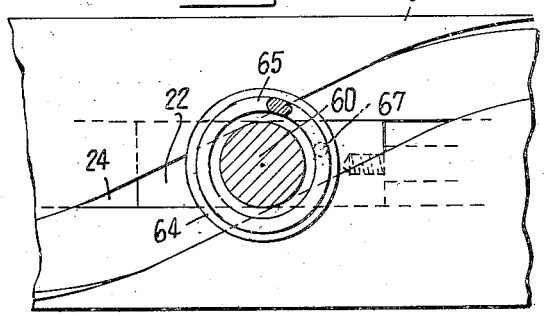
INVENTOR
Ewald Boecking
BY
Austin & Dix
ATTORNEYS Patented Apr. 14, 1936

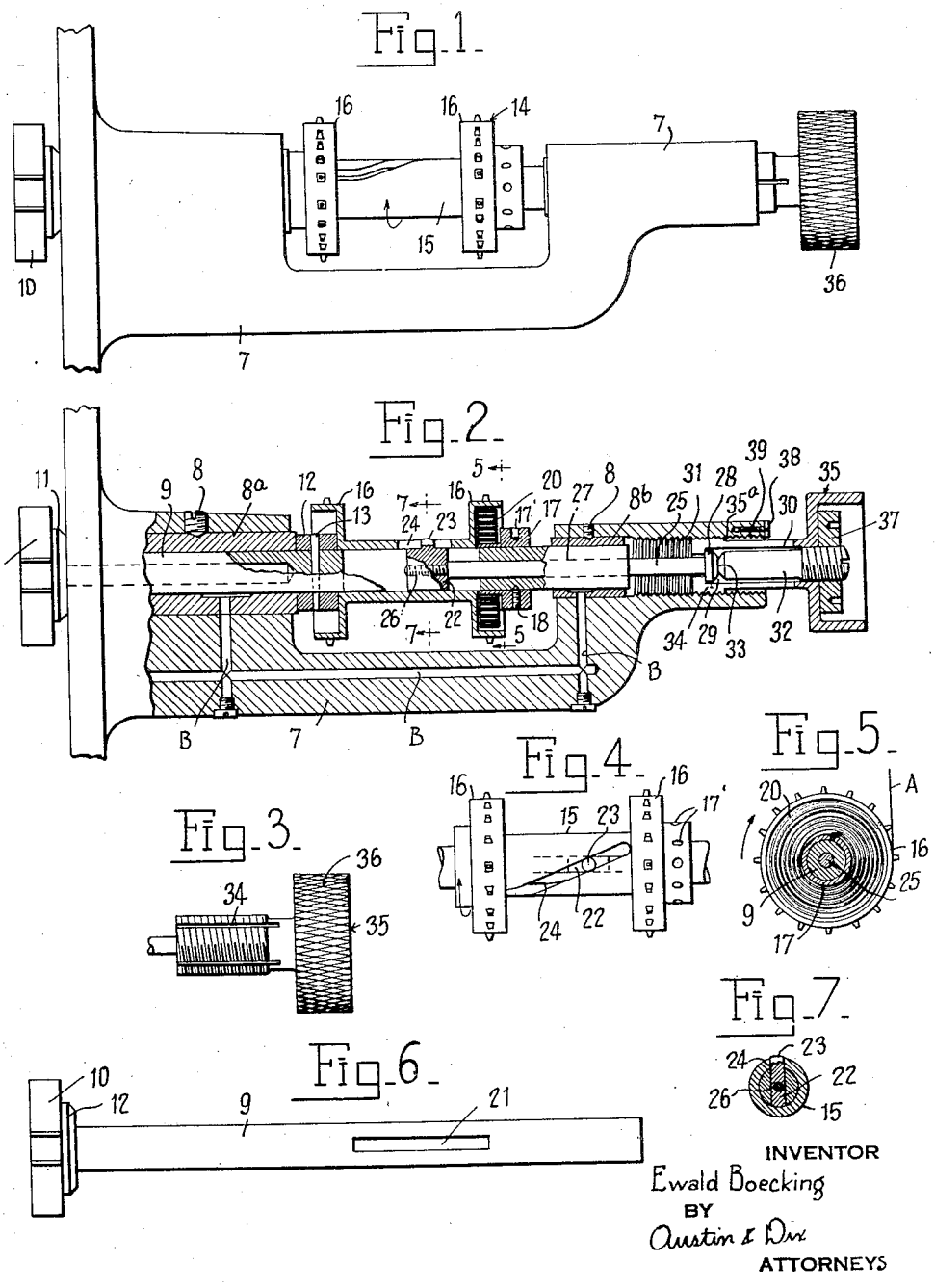

2,037,454

UNITED STATES PATENT OFFICE 2,037,454

FILM FRAMING DEVICE

Ewald Boecking, Brooklyn, N. Y., assignor to International Projector Corporation, New York, N. Y., a corporation of Delaware Application August 10, 1934, Serial No. 739,208

3 Claims. (Cl. 88—17)

This invention relates to an improved framing device especially suited for use in connection with motion picture film.

When a motion picture film is fed past an opening (more strictly on an "aperture") which determines the cross-sectional area of the light adjacent the film, it sometimes happens that the film gets out of frame with respect to the aperture. An illustration of this occurs when motion pictures are projected onto a screen with the bottom half of the pictures at the top of the screen, and the top half of the pictures below. It is then necessary to "frame" the film and this should be accomplished rapidly and handily, without interfering with the operation of the mechanism which feeds the film forward.

A feature of the present invention accordingly resides in the provision of an improved framing device, especially adapted for the purposes indicated.

A further feature is the provision of a superior framing device which is readily and efficiently operable irrespective of the operation of the film feeding mechanism.

A more specific feature resides in the provision of a film framing device which cooperates with an intermittently operating film sprocket of the type commonly employed in motion picture projecting machines, and which enables the framing of the film while the sprocket is operating.

Another feature is the provision of such a device which eliminates back-lash and thus avoids releasing the desired tension imposed on the film by the pull of the sprocket drawing film past the aperture, consequently tending to eliminate jerking of the film.

Still another feature is the provision of film framing mechanism which enables relative angular movement of a film feeding sprocket with respect to the shaft on which the sprocket is mounted, the mechanism being capable of being locked or held in adjusted position and of being simply and easily released and adjusted.

At this point it may be noted that while the invention has been developed and is especially useful in connection with an intermittent film sprocket of a projection machine, which draws the film past an aperture and periodically stops the film momentarily to permit each view on the film to be projected by light passing through the aperture, so that the views may be properly framed, it is also useful in connection with sound devices, printers, cameras, continuous projectors, and the like.

Another feature of the invention is the provision of a device of the character mentioned which is simple and inexpensive to manufacture, durable in service, easy to lubricate, and handy for manipulation by the operator of the machine.

Other features, objects and advantages of the invention will be in part pointed out and in part become apparent in connection with the following detailed description of one illustrative embodiment, references being had to the accompanying drawings, wherein:

Fig. 1 is a side elevation of a form of device in accordance with the invention;

Fig. 2 is a vertical section through the construction shown in Fig. 1;

Fig. 3 is a side elevation illustrating a detail of one form of adjusting handle;

Fig. 4 is a side elevation of the sprocket shown in Fig. 2, but turned 90° to its position therein;

Fig. 5 is a vertical section taken on the line 5—5 of Fig. 2, looking in the direction of the arrows;

Fig. 6 is a side elevation of the shaft shown in Fig. 2, also turned 90° to its position therein;

Fig. 7 is a section taken on the line 7—7 of Fig. 2;

Fig. 8 is a view similar to Fig. 2 but showing a somewhat modified form of device, also in accordance with the invention; Fig. 8a is a detail of parts of Fig. 8;

Fig. 9 is an enlarged, cross-sectional, detail view, taken in the same plane as Fig. 2, and partly broken away, illustrating another modification in accordance with the invention; and Fig. 10 is a horizontal section taken on the line 10—10 of Fig. 9, looking down.

Referring first to Figs. 1 to 7, inclusive, a stationary U-shaped portion 7 of the frame of a motion picture projecting machine may be provided for supporting a shaft 9 at either end through bushings 8a and 8b, which may be firmly seated in any convenient manner in openings in the U-shaped portion. If desired the bushings may be secured in place by set-screws 8. The shaft 9 may be lubricated by oil supplied through conduits B, aligned with suitable holes in the bushings, or bushings may be employed which do not require lubrication. To one end of the shaft 9 there is secured the star-wheel 10 of Geneva mechanism for intermittently rotating the shaft. The intermittent mechanism may be of any convenient or known construction and may be driven from any suitable source of power (not shown), in the usual or other manner.

For preventing end play of the shaft 9, it may be provided with a flange 11, for bearing against one end of the bushing 8a, and with a collar 12, secured to the shaft as by a pin 13, for bearing against the other end of this bushing. Carried by the shaft 9 there is provided a sprocket 14 having a central portion 15, of relatively small outside diameter journalled on the shaft, and end portions 16 of larger diameter carrying the sprocket teeth. End play of the sprocket may be prevented by rigidly securing a collar 17 to the shaft, for instance by a set screw 18, so that the collars 12 and 17 bear against end faces of the central portion of the sprocket without binding.

One or both end portions 16 of the sprocket 14 may be recessed for receiving a coil spring 20 or a pair of such springs, one at either end of the sprocket, if desired. As best shown in Fig. 5, the inner end of spring 20 is secured to collar 17, and thus to shaft 9, while the outer end of the spring is secured to portion 16 of the sprocket. This may be accomplished by hooking the ends of the spring into these members.

The portion of the shaft 9 which lies within the portion 15 of the sprocket is provided with a slot 21, within which a block 22 is snugly mounted for sliding axially of the shaft. The block 22 is provided with a pin 23 which extends into a slot 24 in the portion 15 of the sprocket. The slot 24 is inclined with respect to the length of the shaft, so that upon longitudinal movement of the block 22, the pin 23 will engage the wall of slot 24 and thus effect rotation of the sprocket 14 with respect to shaft 9.

The spring 20 is arranged to constantly urge the sprocket to turn opposite to the direction of rotation of shaft 9, as shown by the arrows in Figs. 1 and 5 so that any play between pin 23 and slot 24 will be taken up. That is to say, the side of the slot against which the pin bears, to drive the sprocket, is held firmly against the pin, thus taking out play and insuring that the sprocket will maintain the film between it and the film gate under tension.

Means are provided for effecting longitudinal movement of the block 22, and may advantageously comprise a rod 25 having one end 26 engaged with the block in any convenient manner, for instance threaded securely into the latter. The right-hand end of the shaft 9 may be provided with a bore 27 for slidably mounting the rod 25, and the right-hand end of the rod 25 may be provided with a ferrule 28 which is received in a recess 29 formed in a threaded member 30, the end wall of the recess serving as a thrust bearing for the ferrule. The threaded member 30 cooperates with internal threads 31 formed in the right-hand arm of the U-shaped member 7. A bolt 32 is threaded internally in the member 30 and is preferably provided with a rounded end 33 for bearing against ferrule 28.

In order to enable the operator to instantly turn the member 30 to correct framing position, without loosening any lock-nut or the like, the threaded portion of member 30 may be split, as shown at 34 in Fig. 3, into a number of segments one or more of which may be sprung outwardly to lock the member in any selected position. The member 30 may be provided with an enlarged end portion 35 for allowing the operator to grip the member and turn it as described. The outer surface of the portion 35 may be roughened as at 36, if desired. A suitable lock-nut 37 is preferably provided for maintaining the bolt 32 in proper position for abutting against the ferrule 28.

Through this construction, it will be seen that when the member 30 is turned in either direction the block 22 is moved longitudinally in the shaft 9 and by means of pins 23 and slots 24 causes the sprocket 14 to be rotated with respect to the shaft. If desired, before a film A is engaged with sprocket 14, the block 22 may be moved toward the right-hand end of the slot 21. Then, after the film is in the machine, the member 30 may be turned to advance it toward the left in Fig. 2, in order to rotate the sprocket clockwise (Fig. 5) and thus draw the film down until it is properly framed.

In order to insure that the pin 23 will not wedge against the ends of slot 24, and that the spring 20 will remain at all times effective for purposes indicated, suitable stop means may be advantageously provided for preventing the pin from reaching either end of the slot. For instance, movement in one direction may be limited by abutment of internal shoulders 35a of member 30 against the head 38 of a bolt 39 threaded or otherwise secured to member 7. Movement in the other direction may be limited by abutment of handle 35 with the end of member 7 or with head 38. It will be appreciated that the length and inclination of the effective portion of slot 24 should advantageously be such as to permit proper framing to be accomplished by turning the handle rapidly in one direction or the other, no matter how badly the pictures are out of frame. If desired a pair of opposed slots and pins may be employed, though this somewhat complicates manufacturing operations.

In assembling the present construction, the bushing 8a and collar 12 may be slid on shaft 9 after which collar 12 is secured in place. The block 22, having pin 23 formed thereon or secured thereto, may be next inserted in the slot 21 and the shaft assembly may be inserted in frame 7 from the left-hand side of Fig. 2, whereafter the sprocket 14, after assembly with spring 20 and collar 17, is slid onto the shaft as the shaft is slid toward the right into the position shown. The left-hand end of slot 24 may be open to permit the pin 23 to enter this slot in the sprocket. Bushing 8b having been previously assembled with frame 7, the shaft 9, after being engaged with sprocket 14 and collar 17, may be slid into this bushing. After collar 17 is turned counter-clockwise (Fig. 5), to place spring 20 under tension, in order to take play out of the sprocket under operating conditions, the set screw 18 is turned up against the shaft 9. For aiding in turning collar 17 with respect to sprocket 14, in order to wind the spring 20 and place it under tension, so that its tendency is always to urge the leading wall of slot 24 into engagement with the pin 23, the collar 17 may be provided with a series of holes 17' for receiving an end of a suitable tool.

Block 22 may then be held at the right-hand end of slot 21 and the member 30 may be screwed as far as it will go into frame 7, while the rod 25 is screwed securely into the block. To enable this to be accomplished, the ferrule 28 may have slots (not shown) formed in its sides, for engagement by a bifurcated tool. The bolt 32 is then screwed down and lock-nut 37 is applied. The bolt 39 is then secured to the frame 7.

When the present invention is employed in combination with a continuously rotating shaft, as in the case of a sound unit for cooperation with a sound track on the film, the spring 20 may be omitted, if desired, and the two ends of the sprocket, and the two positioning collars, may be made respectively alike.

Referring now to Fig. 8, there is shown a construction which in many respects is similar to the construction described. However, in this form there are means providing a self-locking action of the pin 23 with respect to the slot 24 in the sprocket. For instance, blocks 22a and 22b, which may advantageously be formed as shown in Fig. 8a, are provided, to form a tapered recess 40 in which seats a frusto-conical element 41 carried by a rod 42 which extends into a recess 43 in a member 44 threadedly engaged with internal threads in one arm of the member 7. A sleeve 45 is journalled within the shaft 9 and upon the rod 42 and extends into the recess 43. One end of the sleeve 45 is provided with a flanged end-portion 46 which lies in a recess 47 formed in the blocks 22a and 22b. The construction of these parts is such that the shaft, blocks and rod may freely rotate together with respect to the sleeve.

Within the recess 43, the sleeve is preferably provided with a flange 47 lying between the end wall of recess 43 and a tube 56 held within this recess by abutment against a plate 50. A coil spring 48 may surround rod 42, being operatively interposed between the flange 47 and a head 49 formed on the right-hand end of the rod. The spring 48 is arranged to be under compression at all times so that it constantly urges the conical portion 41 into wedged relation with the blocks 22a, 22b thus holding the pin 23 in fixed position with respect to the sprocket and taking out play. In order to enable the release of the wedge, means of the following character may be employed. For instance, across the end of the recess 43 there may be bolted to member 44, or otherwise secured thereto, a plate 50 in which there is slidably mounted a push rod 51 having a collar 52 secured thereto and lying in the recess for abutment against the end 49 of the rod 42. Yielding means, for instance, a spring 53 may be interposed between the collar 52 and the plate 50 for normally urging the push rod 51 against the rod 42. To the outer end of the push rod 51 there may be attached a thumb piece 54. The end-portion 55 of the member 44 may be enlarged and suitably shaped for gripping by the operator.

When it is desired to adjust the device, in order to frame the film, it is simply necessary in the form just described, to press the thumb piece 54, thus releasing the wedge, and to turn the handle 55 in the proper direction to move the pin 23 and thus advance the sprocket 14 angularly with respect to the shaft 9. The pin 23 and blocks 22a, 22b are automatically locked in the proper position upon the release of the thumb piece 54.

Through the present construction there is thus provided an extremely simple and efficient locking mechanism which automatically holds the pin 23 against the wall of the slot 24, all without the need for providing spring means carried directly by the sprocket.

With reference now to Figs. 9 and 10, there is illustrated a modified form of construction which avoids certain objections to the form illustrated in Figs. 1 to 7. For example, when the spring 20 is wound up, as described, it is always under considerable tension, and may become brittle and break under the strain of long periods of intermittent action, being thus subjected to considerable and repeated jerking. The construction illustrated in Figs. 9 and 10 overcomes this disadvantage. In this form of construction a block 22 may be provided with a pin 60 which extends outside the slot 24 in the sprocket portion 15. The end of this pin 60 may be shouldered as at 61 and may have secured thereto a collar 62 by means of the set-screw 63, or other suitable device. A second collar 64 surrounds the pin 60 and may bear against the walls of portion 15 of the sprocket, at either side of the slot 24. This collar 64 is free to turn with respect to the pin 60, and a coil spring 65 may have one end 66 attached to the collar 62 and its other end 67 attached to an arm 68 of the collar 64, the arm extending into the slot 24 in the sprocket and bearing against one wall thereof so that the spring constantly tends to urge the pin against the other wall of the slot. In this fashion, the spring 65 may be subjected to only a slight angular displacement in order to enable it to exert the desired force, so that the full force of the spring may be employed for holding the pin against the wall of the slot. Moreover, this construction is extremely simple and effective, not only from manufacturing, but also from assembly and durability viewpoints.

It will be seen that through the present construction there is provided a simple and effective device for framing a film. Moreover, the framing is accomplished, irrespective of the operation or rotation of the shaft 9, so that even though the shaft 9 is rotating the operator may instantly adjust the framing of the film. In addition, the sprocket is firmly held against the element which drives it. Thus back-lash or play is eliminated, while at the same time the need for excessively accurate machining is avoided. The film sprocket is thus enabled to maintain the film under tension between the sprocket and the film gate (not shown), which exerts a drag on the film.

Another advantage of the present construction resides in the fact that the shaft 9, on which the sprocket is mounted, is supported at both ends by the U-shaped frame 7. In other words, the shaft is in effect supported by both arms of the U, thus making for a particularly satisfactory bearing for the sprocket.

In addition, there is a minimum of friction between the sprocket adjusting means and the rotatable parts. All moving parts of the device may be readily lubricated, as by oil passages B formed in frame 7. The recess 29 may be packed with grease.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

I claim:

1. In a device of the character described, a shaft, a sprocket mounted thereon, a pin and slot construction operatively interposed between said sprocket and shaft, a block carrying said pin and slidable axially within the shaft, a rod extending beyond one end of the shaft and connected to the block, a U-shaped frame carrying spaced bearings for said shaft, and means adapted to move said rod axially of said shaft and to enable said rod to rotate with respect to said means, said means comprising a split, self-locking threaded member having a recess for receiving lubricant.

2. In a motion picture projecting machine, an intermittently rotating shaft, a sprocket carried therewith, a coil spring operatively interposed between said sprocket and shaft, a pin carried for axial sliding with respect to the shaft, an inclined slot in the sprocket, a rod connected to said pin, carried in the shaft, and extending beyond the end thereof, and adjustable means adapted to abut against the end of said rod for maintaining said pin in determined position during operation of the shaft and for preventing said pin from reaching either end of said slot.

3. In a motion picture projecting machine, a shaft, a sprocket journaled on said shaft, a U-shaped frame adapted to carry bearings for said shaft, means to supply lubricant to said bearings, means comprising a rod journaled in said shaft and extending beyond one end thereof for effecting angular adjustment of said sprocket with respect to said shaft, and means forming thrust bearings for the end of said rod and comprising a chamber for lubricant.

EWALD BOECKING.